United States Patent
Shirakawa et al.

(10) Patent No.: US 9,115,621 B2
(45) Date of Patent: Aug. 25, 2015

(54) METAL PARTICLES, EXHAUST GAS PURIFYING CATALYST COMPRISING METAL PARTICLES, AND METHODS FOR PRODUCING THEM

(75) Inventors: Shogo Shirakawa, Gotenba (JP); Naoto Nagata, Susono (JP); Kimiyasu Ono, Susono (JP); Daichi Sato, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/002,793

(22) PCT Filed: Sep. 8, 2011

(86) PCT No.: PCT/JP2011/071061
§ 371 (c)(1),
(2), (4) Date: Dec. 13, 2013

(87) PCT Pub. No.: WO2012/120711
PCT Pub. Date: Sep. 13, 2012

(65) Prior Publication Data
US 2014/0113810 A1 Apr. 24, 2014

(30) Foreign Application Priority Data
Mar. 4, 2011 (JP) .................. 2011-048107

(51) Int. Cl.
*B01J 23/58* (2006.01)
*F01N 3/08* (2006.01)
(Continued)

(52) U.S. Cl.
CPC .............. *F01N 3/08* (2013.01); *B01D 53/9413* (2013.01); *B01J 23/464* (2013.01); *B01J 23/52* (2013.01);
(Continued)

(58) Field of Classification Search
CPC ............ B01J 23/46; B01J 23/52; B01J 23/66; B01J 35/02
USPC ......................................... 502/330
See application file for complete search history.

(56) References Cited

U.S. PATENT DOCUMENTS 3,840,471 A * 10/1974 Acres ............................ 502/177
5,208,203 A    5/1993 Horiuchi et al.
(Continued)

FOREIGN PATENT DOCUMENTS

CN          101161342     4/2008
EP          2 662 206     1/2014
(Continued)

OTHER PUBLICATIONS

Essinger-Hileman, E. et al., "Aqueous room-temperature synthesis of Au—Rh, Au—Pt, Pt—Rh, and Pd—Rh alloy nanoparticles: fully tunable compositions within the miscibility gaps," J. Mater. Chem., 2011, vol. 21, pp. 11599-11604.

(Continued)

*Primary Examiner* — Cam N. Nguyen
(74) *Attorney, Agent, or Firm* — Finnegan, Henderson, Farabow, Garrett & Dunner, LLP

(57) ABSTRACT

Provided are metal particles comprising an at least partial solid solution of rhodium and gold. Also provided is a method for producing metal particles comprising adding a boron-based reducing agent to a mixed solution containing a rhodium salt and a gold salt to produce the metal particles comprising an at least partial solid solution of rhodium and gold. Furthermore, provided are an exhaust gas purifying catalyst comprising the metal particles supported on a catalyst support and a method for producing the same.

14 Claims, 10 Drawing Sheets

(51) Int. Cl.
*B01D 53/94* (2006.01)
*B01J 23/46* (2006.01)
*B01J 23/52* (2006.01)
*B01J 23/63* (2006.01)
*B01J 23/66* (2006.01)
*B01J 35/00* (2006.01)
*B01J 37/02* (2006.01)
*B01J 37/16* (2006.01)
*B22F 1/00* (2006.01)
*B22F 9/24* (2006.01)
*C22C 1/04* (2006.01)
*B82Y 30/00* (2011.01)

(52) U.S. Cl.
CPC *B01J 23/63* (2013.01); *B01J 23/66* (2013.01); *B01J 35/002* (2013.01); *B01J 35/006* (2013.01); *B01J 35/0013* (2013.01); *B01J 37/0211* (2013.01); *B01J 37/16* (2013.01); *B22F 1/0018* (2013.01); *B22F 9/24* (2013.01); *B82Y 30/00* (2013.01); *C22C 1/0466* (2013.01); *B01D 2255/106* (2013.01); *B01D 2255/1025* (2013.01); *B01D 2255/9202* (2013.01)

(56) References Cited

U.S. PATENT DOCUMENTS

| | | | |
|---|---|---|---|
| 6,121,191 A | 9/2000 | Komatsu et al. | |
| 6,147,027 A * | 11/2000 | Miyake et al. | 502/325 |
| 6,194,338 B1 * | 2/2001 | Andolfatto et al. | 502/101 |
| 6,365,545 B1 | 4/2002 | Komatsu et al. | |
| 6,806,224 B2 | 10/2004 | Yoshihara et al. | |
| 6,861,387 B2 * | 3/2005 | Ruth et al. | 502/184 |
| 7,109,145 B2 * | 9/2006 | Ruth et al. | 502/326 |
| 7,138,353 B2 | 11/2006 | Takeshima et al. | |
| 7,601,670 B2 * | 10/2009 | Yasuda et al. | 502/326 |
| 7,700,521 B2 * | 4/2010 | Giaquinta et al. | 502/345 |
| 7,713,911 B2 * | 5/2010 | Wakamatsu et al. | 502/332 |
| 7,727,931 B2 | 6/2010 | Brey et al. | |
| 7,955,570 B2 | 6/2011 | Insley et al. | |
| 8,105,561 B2 | 1/2012 | Hatanaka et al. | |
| 8,273,504 B2 * | 9/2012 | Goia et al. | 429/524 |
| 8,304,030 B2 | 11/2012 | He et al. | |
| 8,314,048 B2 * | 11/2012 | Brey et al. | 502/344 |
| 8,361,924 B2 | 1/2013 | Tanaka et al. | |
| 8,664,149 B2 * | 3/2014 | Brady et al. | 502/344 |
| 2003/0017943 A1 * | 1/2003 | Shan et al. | 502/243 |
| 2008/0241642 A1 * | 10/2008 | Iordache et al. | 429/44 |
| 2009/0291352 A1 * | 11/2009 | Oshihara et al. | 429/42 |
| 2010/0076208 A1 * | 3/2010 | Dhingra et al. | 549/533 |
| 2010/0190641 A1 * | 7/2010 | Goia et al. | 502/326 |
| 2011/0065025 A1 * | 3/2011 | Yu | 429/524 |
| 2011/0245068 A1 * | 10/2011 | Stamenkovic et al. | 502/101 |
| 2011/0274989 A1 * | 11/2011 | Lu et al. | 429/405 |
| 2012/0094140 A1 | 4/2012 | Kitagawa et al. | |
| 2012/0208696 A1 * | 8/2012 | Stamenkovic et al. | 502/326 |
| 2014/0206530 A1 | 7/2014 | Shirakawa et al. | |

FOREIGN PATENT DOCUMENTS

| | | |
|---|---|---|
| JP | 2002-102679 | 4/2002 |
| JP | 2003-088757 | 3/2003 |
| JP | 2005-313012 | 11/2005 |
| JP | 2006-198490 | 8/2006 |
| JP | 2009-299521 | 12/2009 |
| JP | 2010-100899 | 5/2010 |
| JP | 2010-194384 | 9/2010 |
| JP | 2012-179573 | 9/2012 |
| WO | WO 2010/095761 A2 | 8/2010 |
| WO | WO 2010/122811 A1 | 10/2010 |

OTHER PUBLICATIONS

Office Action for U.S. Appl. No. 14/239,827 dated Oct. 2, 2014.
Ovari, L. et al., "Surface Structure and Composition of Au—Rh Bimetallic Nanoclusters on $TiO_2(110)$: A LEIS and STM Study," J. Phys. Chem. C, 2008, vol. 112, pp. 18011-18016.
Kiss, J. et al., "Role of the nature of support on the structure of Au—Rh bimetallic nanoparticles," Vacuum, vol. 86, 2012, pp. 594-598.
Essinger-Hileman, Elizabeth R. et al., "Aqueous room-temperature synthesis of Au—Rh, Au—Pt, Pt—Rh, and Pd—Rh alloy nanoparticles: fully tunable compositions within the miscibility gaps," J. Mater. Chem., 2011, vol. 21, pp. 11599-11604.
Toshima, Naoki, "Polymer-Protected Bimetallic Nanocluster Catalysts Having Core/Shell Structure for Accelerated Electron Transfer in Visible-Light-Induced Hydrogen Generation," Polymer Journal, vol. 31, No. 11-2, pp. 1127-1132, (1999).
Kiss, J. et al., "Characterization of Au—Rh and Au—Mo Bimetallic Nanoclusters on $TiO_2(110)$: A Comparative Study," React. Kinet. Catal. Lett., vol. 96, No. 2, pp. 391-396, (2009).
Liu, Licheng et al., "Supported bimetallic $AuRh/\gamma-Al_2O_3$ nanocatalyst for the selective catalytic reduction of NO by propylene," Applied Catalysis B: Environmental, vol. 90, (2009), pp. 1-9.
Toshima, Naoki et al., "Catalytic Activity and Structural Analysis of Polymer-Protected Au—Pd Bimetallic Clusters Prepared by the Simultaneous Reduction of $HAuCl_4$ and $PdCl_2$," J. Phys. Chem. 1992, vol. 96, pp. 9927-9933.
Notice of Allowance and Notice of Allowability for U.S. Appl. No. 14/239,827 dated Jan. 6, 2015.
Notice of Allowance and Fee(s) Due and Notice of Allowability for U.S. Appl. No. 14/239,827 dated Apr. 22, 2015.

\* cited by examiner

Fig.5
(a)
(b)
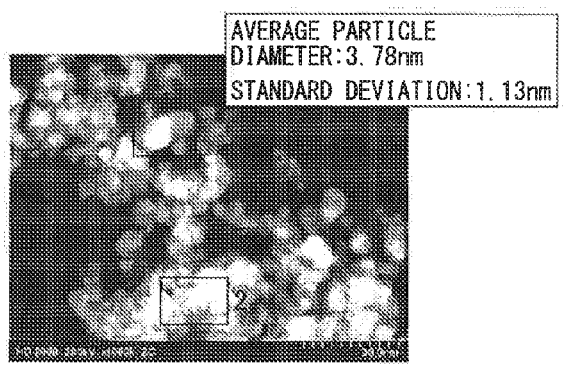
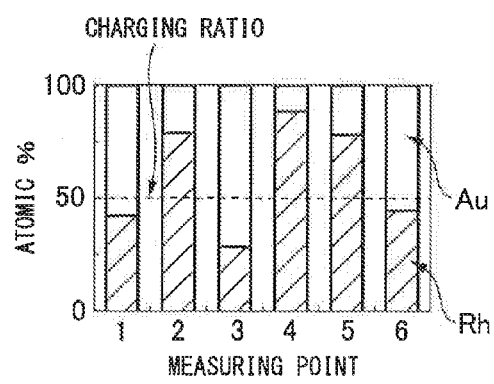

Fig.7
(a)
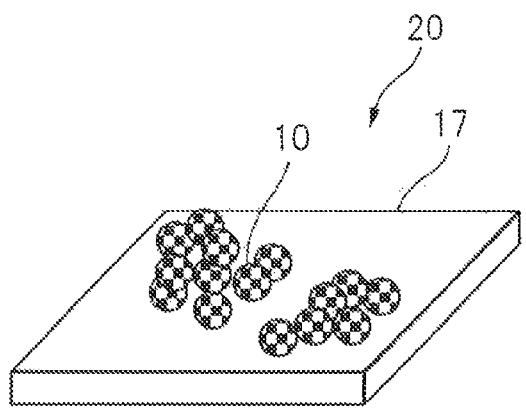
(b)
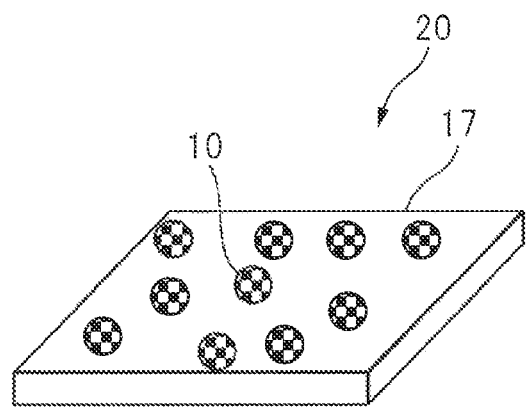

Fig.8
(a) 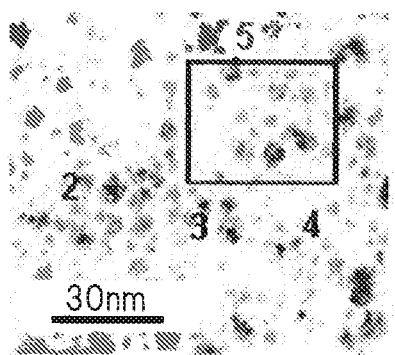
(b) 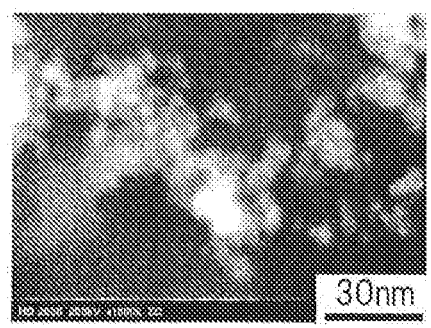

METAL PARTICLES, EXHAUST GAS PURIFYING CATALYST COMPRISING METAL PARTICLES, AND METHODS FOR PRODUCING THEM

CROSS-REFERENCE TO RELATED APPLICATIONS

This application is a national phase application of International Application No. PCT/JP2011/071061, filed Sep. 8, 2011, and claims the priority of Japanese Application No. 2011-048107, filed Mar. 4, 2011, the content of both of which is incorporated herein by reference.

TECHNICAL FIELD

The present invention relates to metal particles, an exhaust gas purifying catalyst comprising the metal particles, and methods for producing them, more specifically metal particles comprising rhodium and gold, an exhaust gas purifying catalyst comprising such metal particles as a catalyst component, and methods for producing them.

BACKGROUND ART

Alloys consisting of a plurality of metal elements exhibit properties different from those of component metal elements. Therefore, unique properties that were not able to be attained with conventional metals are expected to be obtained by creating a new alloy. On the other hand, metal fine particles such as metal nanoparticles have a large surface area and can exhibit properties and structures different from bulk materials, and therefore are expected to be used in various applications. For these reasons, a variety of alloy fine particles have been previously studied. Also, in the application of an exhaust gas purifying catalyst for an automobile, use of such alloy fine particles as a catalyst component has been investigated.

Japanese Unexamined Patent Publication (Kokai) No. 2006-198490 describes an exhaust gas purifying catalyst comprising a support consisting of an oxide and alloy particles supported on the support wherein the alloy particles are a solid solution of a plurality of metal components, wherein the alloy particles have a particle diameter of 100 nm or less, and wherein the alloy particles are a solid solution of at least two of Pt, Ir, Pd, Rh, Ru, Au and Ag.

Japanese Unexamined Patent Publication (Kokai) No. 2010-194384 describes a catalyst for purification of exhaust gas comprising a support made of a metal oxide; and metal particles supported on the support, wherein the metal particles are made of a solid solution of at least one first metal selected from the group consisting of Pt, Ag, Mn, Fe and Au with at least one second metal selected from the group consisting of Pd, Rh, Ir and Ru, an average primary particle diameter of the metal particles is 1.5 nm or less, and a standard deviation in metal composition ratio of each primary particle of the metal particles is 10% or less.

Japanese Unexamined Patent Publication (Kokai) No. 2005-313012 describes an exhaust gas purifying catalyst comprising a substrate and catalytic active particles wherein the catalytic active particles are dispersed and supported on the substrate and are shaped into a shell form from one or more metals or metal oxides, wherein the catalytic active particles have a diameter in a longitudinal direction of 5 nm to 20 nm and a thickness is 1 nm to 10 nm, and wherein the catalytic active particles are formed by one or more metal elements selected from Pt, Rh, Pd, Au, Ag and Ru; a solid solution comprising two or more of the metal elements; or a metal oxide obtained by oxidizing the metal elements.

SUMMARY OF THE INVENTION

As described above, Japanese Unexamined Patent Publication (Kokai) No. 2006-198490, Japanese Unexamined Patent Publication (Kokai) No. 2010-194384 and Japanese Unexamined Patent Publication (Kokai) No. 2005-313012 describe fine particles of an alloy or a solid solution including combinations of various metals as a catalyst component in an exhaust gas purifying catalyst. However, since rhodium (Rh) and gold (Au) cannot form a solid solution in a bulk state having a larger volume compared to nanoparticles, etc., as shown in a phase diagram of FIG. 1, it is difficult to produce a solid solution of rhodium and gold in the methods described in these patent documents. In fact, these patent documents do not specifically disclose a solid solution comprising a specific combination of rhodium and gold, or an exhaust gas purifying catalyst comprising the solid solution as a catalyst component.

Therefore, an object of the present invention is to provide novel metal particles comprising rhodium and gold, an exhaust gas purifying catalyst comprising the metal particles, and methods for producing them.

The present invention for attaining this object is as follows.

(1) Metal particles, comprising an at least partial solid solution of rhodium and gold, wherein the metal particles have a diffraction peak at $38.1° < 2\theta < 41°$ in X-ray diffraction with a CuKα ray.

(2) The metal particles as described in item (1), wherein the metal particles have an average particle diameter of 6 nm or less.

(3) The metal particles as described in item (2), wherein the metal particles have an average particle diameter of 4 nm or less.

(4) The metal particles as described in any one of items (1) to (3), wherein the metal particles have a rhodium content of 50 atomic % or more and less than 100 atomic %.

(5) The metal particles as described in item (4), wherein the metal particles have a rhodium content of 95 atomic % or more and 99 atomic % or less.

(6) An exhaust gas purifying catalyst, comprising the metal particles as described in any one of items (1) to (5) supported on a catalyst support.

(7) A method for producing metal particles, comprising adding a boron-based reducing agent to a mixed solution containing a rhodium salt and a gold salt to produce the metal particles comprising an at least partial solid solution of rhodium and gold.

(8) The method as described in item (7), wherein the boron-based reducing agent is at least one of ammonia borane and sodium borohydride.

(9) The method as described in item (8), wherein the boron-based reducing agent is sodium borohydride.

(10) The method as described in any one of items (7) to (9), wherein the mixed solution further contains a protecting agent.

(11) The method as described in any one of items (7) to (10), wherein the mixed solution contains the rhodium salt and the gold salt in amounts such that the metal particles have a rhodium content of 50 atomic % or more and less than 100 atomic %.

(12) The method as described in item (11), wherein the mixed solution contains the rhodium salt and the gold salt in amounts such that the metal particles have a rhodium content of 95 atomic % or more and 99 atomic % or less.

(13) An exhaust gas purifying catalyst, comprising metal particles supported on a catalyst support, wherein the metal particles comprises an at least partial solid solution of rhodium and gold, and wherein the metal particles have a diffraction peak at $38.1°<2θ<41°$ in X-ray diffraction with a CuKα ray.

(14) A method for producing an exhaust gas purifying catalyst, comprising:
adding a boron-based reducing agent to a mixed solution containing a rhodium salt and a gold salt to produce metal particles comprising an at least partial solid solution of rhodium and gold; and
supporting the produced metal particles on a catalyst support.

BRIEF DESCRIPTION OF THE DRAWINGS

FIG. 5 shows an analysis of the metal particles of Example 1 by a scanning transmission electron microscopy equipped with an energy dispersive X-ray spectroscopy (STEM-EDX).

FIG. 7 is a diagram schematically showing the exhaust gas purifying catalyst of the present invention.

FIGS. 8(a) and 8(b) show photographs of Rh—Au metal particles (Rh content: 97 atomic %) in Examples 3 and 4, respectively, taken by STEM-EDX.

MODE FOR CARRYING OUT THE INVENTION

Figure 1:
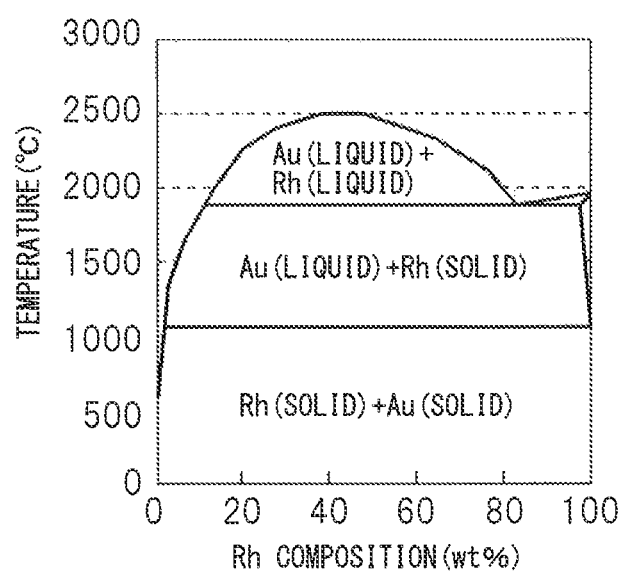
FIG. 1 is a phase diagram of rhodium and gold.

The metal particles of the present invention comprise an at least partial solid solution of rhodium and gold.

As described above, since rhodium and gold cannot form a solid solution in a bulk state having a larger volume, it is extremely difficult to produce alloy particles which are a solid solution of rhodium and gold at the atomic level.

More specifically, the atomic radius of a metal, coupling angle or crystallinity, etc., may vary depending on the type of metal. Therefore, an attempt to mix different metals such as rhodium and gold in a bulk state having a larger volume compared to nanoparticles, etc., may introduce a strain in the crystal lattice. Thus, it is very difficult to homogeneously mix these metals. In fact, alloy particles which are a solid solution of rhodium and gold at the atomic level have not been reported so far. The term "alloy" used herein is intended to encompass not only a so-called intermetallic compound, but also a solid solution in which two or more elements are mutually dissolved, thereby forming an overall solid phase.

The expression "an at least partial solid solution of rhodium and gold" in the present invention encompasses a state in which both elements of rhodium and gold are mutually dissolved, thereby forming an overall homogeneous solid solution (a completely solid solution state), and a state in which both elements of rhodium and gold are not completely solid-solutioned, but are at least partially solid-solutioned (an incomplete solid solution state). For example, the expression "an at least partial solid solution of rhodium and gold" in the present invention encompasses the case in which metal particles comprising rhodium and gold have a diffraction peak between diffraction peaks corresponding to the Rh (111) plane and Au (111) plane, respectively, in X-ray diffraction with a CuKα ray, specifically the case in which the metal particles have a diffraction peak at $38.1°<2θ<41°$.

Conventionally, a method comprising adding a reducing agent such as an alcohol to a mixed solution containing salts of metals constituting an alloy, and simultaneously reducing metal ions contained in the mixed solution under heating, etc., as necessary, is known as one method for producing alloy particles. For example, Polymer Journal, 31, No. 11-2, 1127-1132 (1999) describes a method comprising producing metal particles comprising gold and rhodium by alcohol reduction. However, even if such a conventionally known method is applied to rhodium and gold, it is not possible to obtain metal particles comprising a solid solution of rhodium and gold at the atomic level. Further, even if metal particles comprising gold and rhodium are produced by such a method, it is unlikely that properties specific to an alloy will be expressed, unless these metal elements are mutually solid-solutioned.

The present inventors have found that the metal particles comprising an at least partial solid solution, in particular a complete solid solution of rhodium and gold at the atomic level can be produced by adding a boron-based reducing agent in place of an alcohol-based reducing agent to a mixed solution containing a rhodium salt and a gold salt.

The metal particles of the present invention may have a very small particle diameter, specifically an average particle diameter of about 6 nm or less, in particular about 4 nm or less. The term "average particle diameter" in the present invention refers to a particle diameter calculated using a crystallite diameter calculating method by the half-width measurement in powder X-ray diffraction.

In the metal particles of the present invention, since both elements of rhodium and gold are present in such extremely fine particles, both of the effect due to alloying of different metals and the effect due to fine particles can be expected to be obtained. In other words, it is believed that the metal particles of the present invention may exhibit properties that could not be obtained by particles of a rhodium or gold simple substance. Therefore, the metal particles of the present invention can be expected to be applied not only in an application of an exhaust gas purifying catalyst for an automobile, etc., but also in a wide range of fields such as electronic conductors, photosensitizers, oxidation-reduction catalysts, etc.

The present invention further provides a method for producing such metal particles comprising an at least partial solid solution of rhodium and gold.

Figure 2:
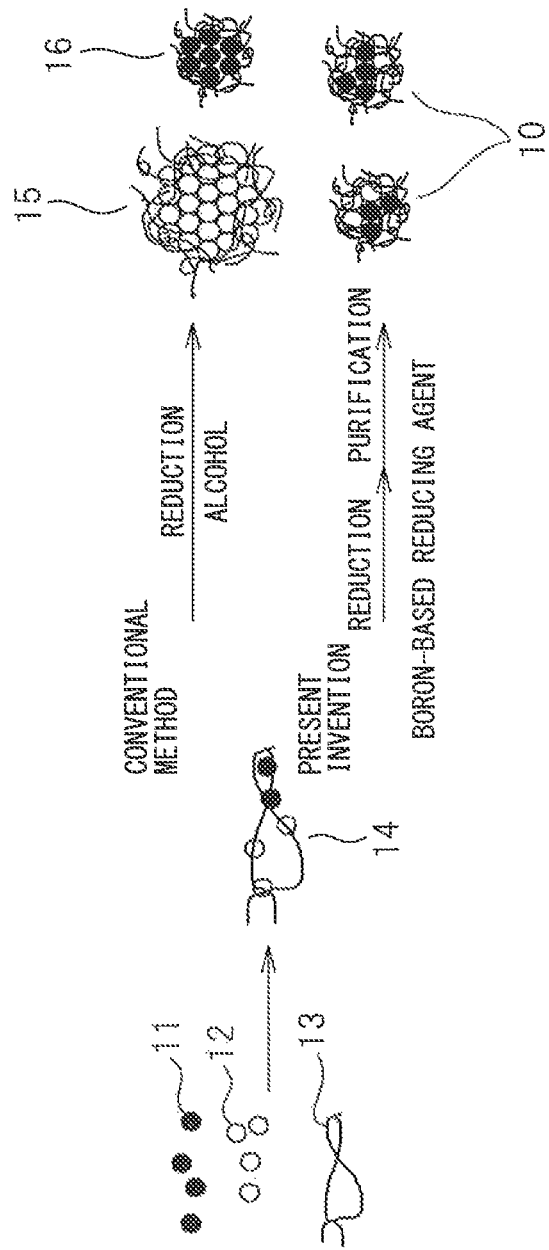
FIG. 2 is a diagram schematically showing a process for producing the metal particles of the present invention.

FIG. 2 is a diagram schematically showing a process for producing the metal particles of the present invention. In order to facilitate understanding, FIG. 2 also shows a conventional method using an alcohol-based reducing agent.

Referring to FIG. 2, first, a rhodium salt and gold salt are dissolved in one or more solvents to prepare a mixed solution containing $Rh^{3+}$ ions 11 and $Au^{3+}$ ions 12, and further optional protecting agent 13 described below. Complex 14 is formed by these ions 11 and 12 and the protecting agent 13. Then, in a conventional method, an alcohol such as ethanol is added as a reducing agent, as shown in the upper side of FIG. 2, and $Rh^{3+}$ ions 11 and $Au^{3+}$ ions 12 contained in the mixed solution are reduced under heating, etc., as necessary. However, when a relatively weak reducing agent such as an alcohol is used, it is believed that $Au^{3+}$ ions 12 that are easily reduced compared to $Rh^{3+}$ ions 11 are preferentially reduced and undergoes grain growth, resulting in separation of Rh and Au phases and formation of Au particles 15 and Rh particles 16, respectively.

In contrast, in the method of the present invention shown in the lower side of FIG. 2, a boron-based reducing agent in place of an alcohol is added as a reducing agent to reduce $Rh^{3+}$ ions 11 and $Au^{3+}$ ions 12 contained in the mixed solution. Subsequently, the residual boron-based reducing agent in the mixed solution is removed by conducting a purification treatment, etc., as necessary. Without being bound by any particular theory, it is believed that since a boron-based reducing agents has a very strong reducing power compared to an alcohol-based reducing agent, use of a boron-based reducing agent as a reducing agent makes it possible to simultaneously reduce both $Rh^{3+}$ ions 11 and $Au^{3+}$ ions 12 dissolved in the mixed solution without preferentially reducing $Au^{3+}$ ions 12 relative to $Rh^{3+}$ ions 11, unlike the case of using an alcohol-based reducing agent. As a result, according to the method of the present invention, it is believed that it is possible to obtain Rh—Au metal particles 10, in which Rh and Au are solid-solutioned at the atomic level.

Metal particles obtained by the method of the present invention are very fine nanoparticles having an average particle diameter of about 6 nm or less, in particular about 4 nm or less, as described above. It is believed that in such nanoparticles, it is possible to relatively easily form a solid solution of different metals, without causing problems including a strain in the crystal lattice, etc., unlike a bulk state having a larger volume. In other words, it is believed that according to the present invention, synthesizing metal particles comprising rhodium and gold in the form of metal fine particles having a nanometer-size average particle, specifically an average particle diameter of about 6 nm or less, in particular about 4 nm or less has made it possible to form a solid solution of rhodium and gold, which cannot be solid-solutioned in a bulk state.

According to the method of the present invention, a rhodium salt and gold salt may include, but are not particularly limited to, for example, chlorides, nitrates, etc.

Also, a solvent used in a mixed solution containing the rhodium salt and gold salt may include any solvent which can dissolve these metal, salts, for example, an aqueous solvent such as water and an organic solvent, etc. In the method of the present invention, a rhodium salt and gold salt may be suitably added to a solvent in amounts corresponding to a desired Rh/Au ratio (atomic ratio) in the finally obtained metal particles. The rhodium salt and gold salt may be added in amounts such that the finally obtained metal particles have a rhodium content of, but not particularly limited to, generally 30 atomic % or more and less than 100 atomic %, preferably 50 atomic % or more and less than 100 atomic %, more preferably 70 atomic % or more and 99 atomic % or less, and most preferably 95 atomic % or more and 99 atomic % or less.

According to the method of the present invention, a boron-based reducing agent added to a mixed solution containing the rhodium salt and gold salt may include, but is not particularly limited to, for example, ammonia borane ($NH_3BH_3$), sodium borohydride ($NaBH_4$), etc., and preferably sodium borohydride may be used. Such a boron-based reducing agent is added in an amount sufficient to reduce rhodium ions and gold ions dissolved in the mixed solution to form metal particles comprising an at least partial solid solution of rhodium and gold.

With regard to ammonia borane, although its applicability as a hydrogen storage material has been reported in prior art documents, etc., use and usefulness of ammonia borane as a reducing agent in producing alloy particles, etc., are not generally known. Thus, it is very unexpected and surprising that as in the method of the present invention, use of ammonia borane as a reducing agent makes it possible to form a solid solution of rhodium and gold at the atomic level, which cannot be solid-solutioned in a bulk state.

Also, with regard to sodium borohydride, the present inventors have found that using sodium borohydride as a boron-based reducing agent in the method of the present invention improves the dispersibility of the obtained metal particles (primary particles), compared to the case of using ammonia borane as a boron-based reducing agent, and therefore formation of secondary particles having a larger particle diameter by aggregation of these primary particles can be significantly suppressed.

Without being bound by any particular theory, it is likely that such improved dispersibility of metal particles obtained when sodium borohydride is used as a boron-based reducing agent may be attributable to, for example, a stronger reducing power of sodium borohydride compared to ammonia borane, or the fact that the effect of a protecting agent described below is promoted by the presence of sodium borohydride. Referring more specifically to the latter, it is believed that use of sodium borohydride makes it possible to promote coordination of the protecting agent to metal particles, compared to the case of using ammonia borane, resulting in improving dispersibility of the obtained metal particles.

Furthermore, in a conventional method for producing alloy particles using an alcohol-based reducing agent, it is generally necessary to conduct a heating process, etc., when respective metal ions contained in a mixed solution are reduced by the alcohol-based reducing agent. However, according to the method of the present invention, simply adding a boron-based reducing agent to a mixed solution containing a rhodium salt and a gold salt and mixing the mixed solution make it possible to simultaneously reduce rhodium ions and gold ions contained in the mixed solution at room temperature without particularly requiring such a heating process to produce metal particles comprising an at least partial solid solution, in particular a complete solid solution of rhodium and gold at the atomic level.

Furthermore, in the method of the present invention, a protecting agent may be optionally added to a mixed solution containing a rhodium salt and gold salt, in order to coordinate or adsorb the protecting agent to the surface of the metal particles produced by the method of the present invention to suppress aggregation and grain growth of the metal particles and stabilize them. The protecting agent may include any known protecting agents for metal colloids. For example, organic polymers and even low molecular weight organic compounds which contain a heteroatom such as nitrogen, phosphorous, oxygen and sulfur and have a strong coordinating power may be used as the protecting agent. The protecting agents of the organic polymers may include polymer compounds such as polyamide, polypeptide, polyimide, polyether, polycarbonate, polyacrylonitrile, polyacrylic acid, polyacrylate, polyacrylamide, polyvinyl alcohol, hetero cyclic polymer, and polyester. Particularly preferably, polyvinyl pyrrolidone, polyvinyl pyrridine, polyacrylamide, etc., may be used. Adding the protecting agent to the above mixed solution can make certain that the size of the obtained metal particles is controlled to a nanometer size.

In a solution containing metal particles comprising rhodium and gold produced by the method of the present invention, the residual boron-based reducing agent is present, which cannot be sufficiently decomposed and removed by only drying the solution. Thus, after simultaneous reduction of rhodium ions and gold ions using a boron-based reducing agent, the solution is preferably subjected to purification treatment with a large amount of acetone, etc. Since this permits the extraction of the residual boron-based reducing agent into an acetone phase, the obtained metal particles can be easily purified.

According to the method of the present invention, it is possible to obtain extremely fine metal particles comprising a solid solution of rhodium and gold at the atomic level which cannot be obtained by a conventional method. Thus, it is believed that the metal particles of the present invention may exhibit properties that could not be obtained by particles of a rhodium or gold simple substance. Therefore, the metal particles of the present invention can be expected to be applied in a wide range of fields.

For example, according to a preferred embodiment of the present invention, the metal particles according to the present invention may be used as a catalyst component. In this connection, there is further provided herein an exhaust gas purifying catalyst comprising the metal particles according to the present invention supported on a catalyst support.

In the technical field of a catalyst for purifying exhaust gas from an automobile, etc., rhodium is generally known to have a high NOx reducing activity, and therefore rhodium is an essential component in an exhaust gas purifying catalyst such as a three-way catalyst. However, for example, there is a problem in that exposure of rhodium to an oxygen-excessive lean atmosphere, etc., forms rhodium oxide and leads to poor metalation of rhodium, resulting in a reduced catalytic performance of the exhaust gas purifying catalyst.

Thus, the present inventors have taken note of and studied gold having a relatively weak affinity for oxygen, synthesized metal particles in which gold is solid-solutioned into rhodium at the atomic level, and have found that when the metal particles are exposed to an oxidative atmosphere, oxidation of rhodium can be remarkably suppressed compared to metal particles of rhodium alone. The present inventors have further found that an exhaust gas purifying catalyst having a remarkably improved NOx reducing ability, especially in a low-temperature region, for example, a temperature region of 400° C. or lower can be obtained by supporting metal particles comprising a solid solution of rhodium and gold on a catalyst support, compared to the case of supporting metal particles of rhodium alone on a catalyst support.

When the metal particles according to the present invention are used as a catalyst component for an exhaust gas purifying catalyst, the metal particles preferably have a rhodium content of, but not limited to, generally 30 atomic % or more and less than 100 atomic %.

When the metal particles have a rhodium content of less than 30 atomic %, the number of rhodium active sites may decrease. In addition, in this case, the rhodium active sites may be covered by gold present in an amount of 70 atomic % or more in the metal particles. Therefore, a sufficient NOx reducing performance may fail be achieved in the finally obtained exhaust gas purifying catalyst. On the other hand, when the metal particles have a rhodium content of 100 atomic %, i.e., the metal particles contain no gold particles, the oxidation suppressing effect of rhodium due to gold cannot be obtained, resulting in a reduction in the NOx reducing performance of the exhaust gas purifying catalyst. According to the present invention, it is possible to maintain the number of rhodium active sites and fully exert the oxidation suppressing effect of rhodium due to gold by controlling the rhodium content in the metal particles at 30 atomic % or more and less than 100 atomic %, preferably 50 atomic % or more and less than 100 atomic %, more preferably 70 atomic % or more and 99 atomic % or less, and most preferably 95 atomic % or more and 99 atomic % or less. As a result, it is possible to obtain an exhaust gas purifying catalyst having a more improved NOx reducing ability, especially at a low temperature.

According to the present invention, a catalyst support for supporting metal particles comprising an at least partial solid solution of rhodium and gold may include, but are not particularly limited to, any metal oxide generally used as a catalyst support in the technical field of an exhaust gas purifying catalyst. Such a catalyst support may include, for example, alumina ($Al_2O_3$), zirconia ($ZrO_2$), ceria ($CeO_2$), silica ($SiO_2$), titania ($TiO_2$) or combinations thereof, etc.

Supporting of metal particles comprising an at least partial solid solution of rhodium and gold on the above catalyst support may be performed by any method known to a person skilled in the art. For example, a solution containing metal particles comprising rhodium and gold is obtained by adding a boron-based reducing agent to a mixed solution containing a rhodium salt and gold salt, and the obtained solution is added to a powder of a metal oxide (catalyst support) dispersed in a predetermined amount of a solution so that the amount of rhodium and/or gold relative to the above powder generally ranges from 0.01 to 10 wt %. Then, the obtained solution may be dried and fired at a predetermined temperature and time, especially at a temperature and time sufficient to decompose and remove the salt portion of the metal salt, an optional protecting agent, etc., and to support the metal particles on the catalyst support, thereby obtaining an exhaust gas purifying catalyst comprising the metal particles of the present invention supported on a catalyst support.

Figure 6:
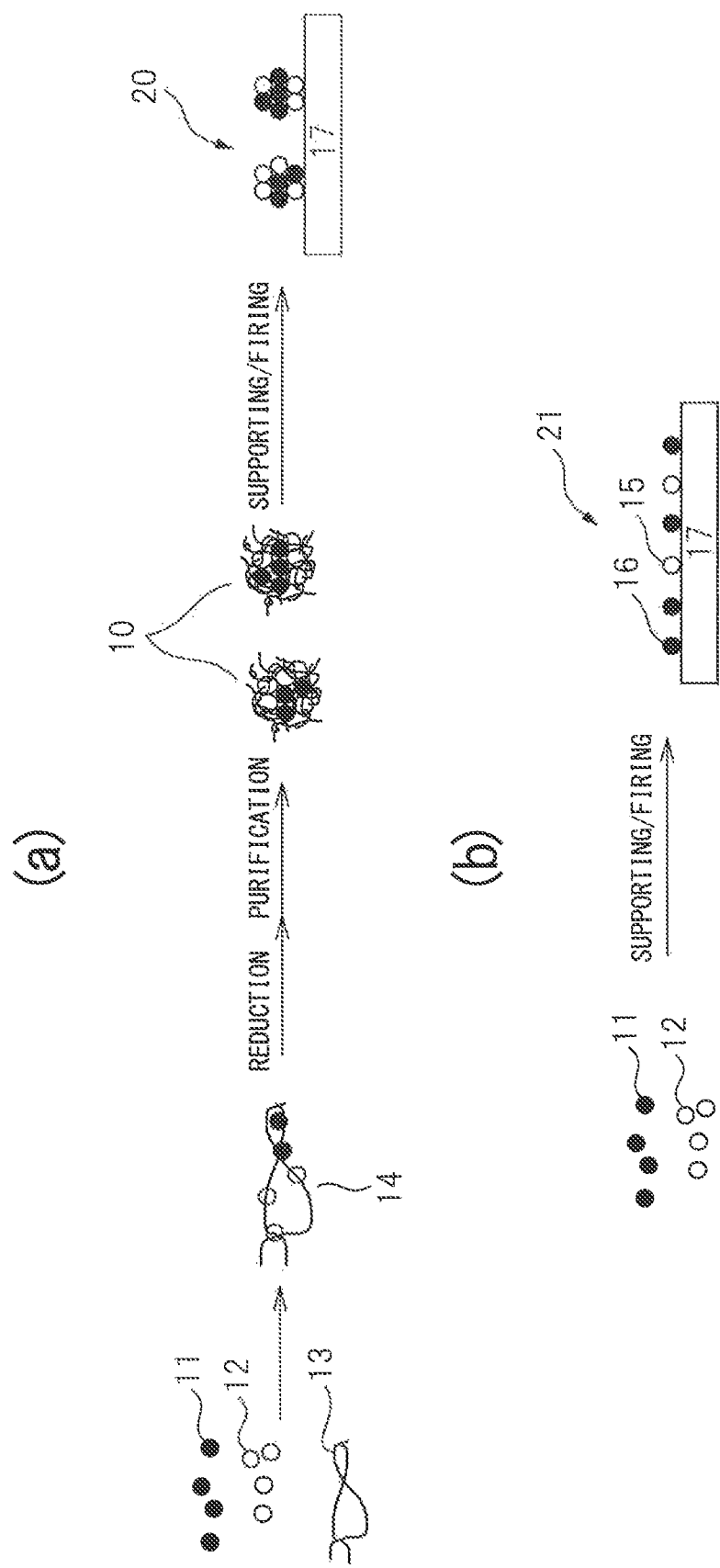
FIG. 6 is a diagram schematically showing a method for producing the exhaust gas purifying catalyst of the present invention.

FIG. 6(a) is a diagram schematically showing a method for producing the exhaust gas purifying catalyst of the present invention. In order to facilitate understanding, FIG. 6(b) also shows a method for producing an exhaust gas purifying catalyst using a conventional impregnation method. Referring to FIG. 6(a), Rh—Au metal particles 10, in which Rh and Au are solid-solutioned at the atomic level, are obtained as explained in FIG. 2, and then catalyst support 17 consisting of a metal oxide, etc., is introduced into a solution containing the Rh—Au metal particles 10, which is then dried and burned, etc., to obtain exhaust gas purifying catalyst 20 comprising the Rh—Au metal particles 10 supported on the catalyst support 17. According to such an exhaust gas purifying catalyst, since oxidation of Rh is suppressed by Au present adjacent to Rh, and furthermore the Rh—Au metal particles 10 have a fine and well controlled particle diameter, it is possible to achieve a remarkably improved exhaust gas purifying performance.

In contrast, referring to FIG. 6(b), in a conventional impregnation method, catalyst support 17 consisting of a metal oxide, etc., is immersed into a solution having a Rh salt and Au salt dissolved therein, which is then dried and fired, etc., at a predetermined temperature and time to obtain exhaust gas purifying catalyst 21 comprising each of Rh particles 16 and Au particles 15 supported on the catalyst support 17. According to a conventional impregnation method as shown in FIG. 6(b), each of Rh and Au metal particles can be supported in a highly dispersed manner on a catalyst support. However, in this exhaust gas purifying catalyst 21, since the particle diameter of Rh particles 16, which is a catalyst component, is too small or is not controlled in a particular range, a sufficiently high exhaust gas purifying performance cannot necessarily be achieved. Also, in the exhaust gas purifying catalyst 21, Rh and Au do not form a solid solution, and are separately present as Rh particles 16 and Au particles 15 on catalyst support 17. Therefore, the oxidation suppressing effect of Rh due to Au cannot be obtained.

In the method for producing the exhaust gas purifying catalyst of the present invention shown above, for example, when Rh—Au metal particles 10 are synthesized using ammonia borane as a boron-based reducing agent, and then the Rh—Au metal particles 10 are supported on catalyst support 17, the Rh—Au metal particles 10 may aggregate to form secondary particles, as shown in FIG. 7(a). However, even in such a case, since the activity of Rh is maintained at a high level by the action of Au present adjacent to Rh in the exhaust gas purifying catalyst of the present invention, it is possible to achieve a sufficiently high exhaust gas purifying performance, especially in a low-temperature region, compared to an exhaust gas purifying catalyst comprising only Rh and no Au supported thereon.

Also, in the method for producing the exhaust gas purifying catalyst of the present invention, for example, when Rh—Au metal particles 10 are synthesized using sodium borohydride as a boron-based reducing agent, and then the Rh—Au metal particles 10 are supported on catalyst support 17, it is possible to suppress aggregation of the Rh—Au metal particles 10, and to obtain exhaust gas purifying catalyst 20 comprising the Rh—Au metal particles 10 supported in a highly dispersed manner on the catalyst support 17, as shown in FIG. 7(b). According to such an exhaust gas purifying catalyst, it is possible to achieve a remarkably improved exhaust gas purifying performance not only in a low-temperature region, but also in a high-temperature region, compared to an exhaust gas purifying catalyst comprising only Rh and no Au supported thereon.

As described above, this description has illustrated the cases, in which the metal particles according to the present invention are used as a catalyst component of an exhaust gas purifying catalyst, in more detail. However, the metal particles according to the present invention are not limited to such a particular application, and may be applied in a wide range of fields such as electronic conductors, photosensitizers, oxidation-reduction catalysts, etc.

The present invention is described in more detail below based on Examples, but the present invention is not limited thereto.

EXAMPLES

In the following examples, metal particles comprising rhodium and gold (Rh—Au metal particles) were synthesized by the method of the present invention, and the physical properties thereof were investigated.

Example 1

Synthesis of Rh—Au Metal Particles Having a Rh Content of 50 Atomic %

First, 60.0 mmol of polyvinyl pyrrolidone (PVP K-25, an average molecular weight of 35000) as a protecting agent was introduced into a 500 mL separable flask, and the polyvinyl pyrrolidone was completely dissolved in 200 mL of ion-exchanged water. Then, 0.75 mmol of chlorauric acid ($HAuCl_4$) as a gold salt, 0.75 mmol of rhodium chloride ($RhCl_3$) as a rhodium salt and 50 mL of ion-exchanged water were added to the obtained solution. While stirring the obtained mixed solution at room temperature, 9.0 mmol of ammonia borane ($NH_3BH$) as a boron-based reducing agent dissolved in 50 mL of ion-exchanged water was added to the above mixed solution in portions. After adding, stirring was continued for further 10 minutes, and the obtained solution was transferred to a 2 L beaker. Then, 1200 mL of acetone was added thereto and left to stand for 6 hours to allow the product to settle spontaneously. The colorless and transparent supernatant was discarded, and the residual ammonia borane was removed. Finally, 100 mL of ethanol was added to a black precipitate, and the black precipitate was dispersed using an ultrasonic cleaner for 15 minutes, thereby obtaining a solution containing metal particles (Rh content: 50 atomic %) comprising Rh and Au.

Example 2

Synthesis of Rh—Au Metal Particles Having a Rh Content of 70 Atomic %

A solution containing metal particles (Rh content: 70 atomic %) comprising Rh and Au was obtained in the same manner as in Example 1, except for using 0.45 mmol of chlorauric acid ($HAuCl_4$) and 1.05 mmol of rhodium chloride ($RhCl_3$).

Comparative Example 1

Synthesis of Rh—Au Metal Particles Having a Rh Content of 50 Atomic %

First, 60.0 mmol of polyvinyl pyrrolidone (PVP K-25, an average molecular weight of 35000) as a protecting agent was introduced to a 1 L separable flask, and the polyvinyl pyrrolidone was completely dissolved in 375 mL of ion-exchanged water and 375 mL of ethanol as an alcohol-based reducing agent. Then, 0.75 mmol of chlorauric acid ($HAuCl_4$) and 0.75 mmol of rhodium chloride ($RhCl_3$) were added to the obtained solution. After the obtained mixed solution was heated at 100° C. using an oil bath to reflux for 2 hours, the reaction solution was allowed to cool to room temperature. Finally, the reaction solution was concentrated to a liquid volume of about 50 mL, thereby obtaining a solution containing metal particles (Rh content: 50 atomic %) comprising Rh and Au.

Comparative Examples 2 to 6

Synthesis of Rh—Au Metal Particles Having a Rh Content of 50 atomic %

Solutions containing metal particles (Rh content: 50 atomic %) comprising Rh and Au were obtained in the same manner as in Comparative Example 1, except for varying the amounts of ion-exchanged water and the types and amounts of alcohol added as a reducing agent.

Comparative Example 7

Synthesis of Rh—Au Metal Particles Having a Rh Content of 70 Atomic %

A solution containing metal particles (Rh content: 70 atomic %) comprising Rh and Au was obtained in the same manner as in Comparative Example 1, except for using 0.45 mmol of chlorauric acid (HAuCl$_4$) and 1.05 mmol of rhodium chloride (RhCl).

The types of the rhodium salt, gold salt and reducing agent, etc., used in each Example and Comparative Example and addition amounts thereof are as shown in the following Table 1.

TABLE 1

|  | HAuCl$_4$ (mmol) | RhCl$_3$ (mmol) | PVP K-25 (mmol) | Ion-exchanged water (mL) | Reducing agent/volume (mL) |
|---|---|---|---|---|---|
| Ex. 1 | 0.75 | 0.75 | 60.0 | 300 | Ammonia borane (9.0 mmol) |
| Ex. 2 | 0.45 | 1.05 | 60.0 | 300 | Ammonia borane (9.0 mmol) |
| Comp. Ex. 1 | 0.75 | 0.75 | 60.0 | 375 | Ethanol/375 |
| Comp. Ex. 2 | 0.75 | 0.75 | 60.0 | 75 | Ethanol/675 |
| Comp. Ex. 3 | 0.75 | 0.75 | 60.0 | 75 | Propanol/675 |
| Comp. Ex. 4 | 0.75 | 0.75 | 60.0 | 375 | Propanol/675 |
| Comp. Ex. 5 | 0.75 | 0.75 | 60.0 | 750 | Ethanol/750 |
| Comp. Ex. 6 | 0.75 | 0.75 | 60.0 | 750 | Propanol/750 |
| Comp. Ex. 7 | 0.45 | 1.05 | 60.0 | 375 | Ethanol/375 |

[Analysis of Metal Particles]

Each of the metal particles obtained in Examples 1 and 2 and Comparative Examples 1 to 7 was measured by X-ray diffraction (XRD) (RINT2000 manufactured by RIGAKU). Specific conditions for measurement are as follows.

Figure 3:
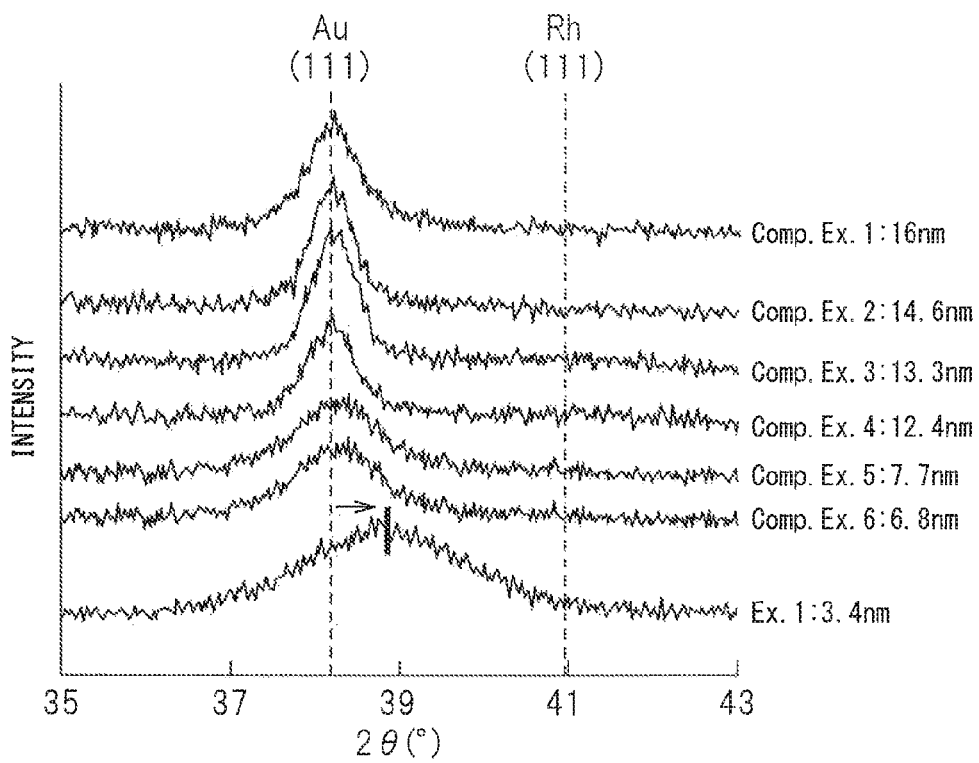
FIG. 3 is a diagram showing X-ray diffraction patterns on samples of Example 1 and Comparative Examples 1 to 6 in which a composition ratio (molar ratio) of rhodium and gold is 1:1.

Measurement method: FT method (Fixed Time method)
X-ray source: CuKα
Step width: 0.02 deg.
Counting time: 0.5 s
Divergence slit (DS): ⅔ deg.
Scattering slit (SS): ⅔ deg.
Receiving slit (RS): 0.5 mm
Tube voltage: 50 kV
Tube current: 300 mA FIG. 3 is a diagram showing X-ray diffraction patterns on samples of Example 1 and Comparative Examples 1 to 6 in which a composition ratio (molar ratio) of rhodium and gold is 1:1. FIG. 3 also shows literature values of diffraction peaks for the Au (111) plane and Rh (111) plane in dotted lines. Furthermore, the average particle diameter of particles detected by X-ray diffraction was calculated using a crystallite diameter calculating method by the half-width measurement in powder X-ray diffraction. FIG. 3 also shows the results thereof.

Referring to FIG. 3, in each sample of Comparative Examples 1 to 6, a diffraction peak from the Au (111) plane was detected at around 2θ=38.1°. This is consistent with the literature value for the Au (111) plane, and no shift in peak was observed relative to the literature value. On the other hand, in each sample of Comparative Examples 1 to 6, no diffraction peak from the Rh (111) plane was detected. These results suggest that in each sample of Comparative Examples 1 to 6, rhodium and gold do not form a solid solution and are separately present as rhodium particles and gold particles, and furthermore rhodium is present as very fine crystals. As shown in FIG. 3, the average particle diameter of Au particles detected in each sample of Comparative Examples 1 to 6 exceeds 6 nm, and the smallest average particle diameter was 6.8 nm in the sample of Comparative Example 6.

In contrast, in the sample of Example 1, a diffraction peak was detected at 2θ=38.9°, thereby confirming that this diffraction peak is located between the literature values (38.1° and 41°, respectively) for the Au (111) plane and Rh (111) plane. In addition, the average particle diameter of the detected particles was 3.4 nm, which was very small compared to each sample of Comparative Examples 1 to 6. It can be seen from these results that the metal particles produced by the method of the present invention are very fine alloy particles, in which rhodium and gold are solid-solutioned at the atomic level.

Figure 4:
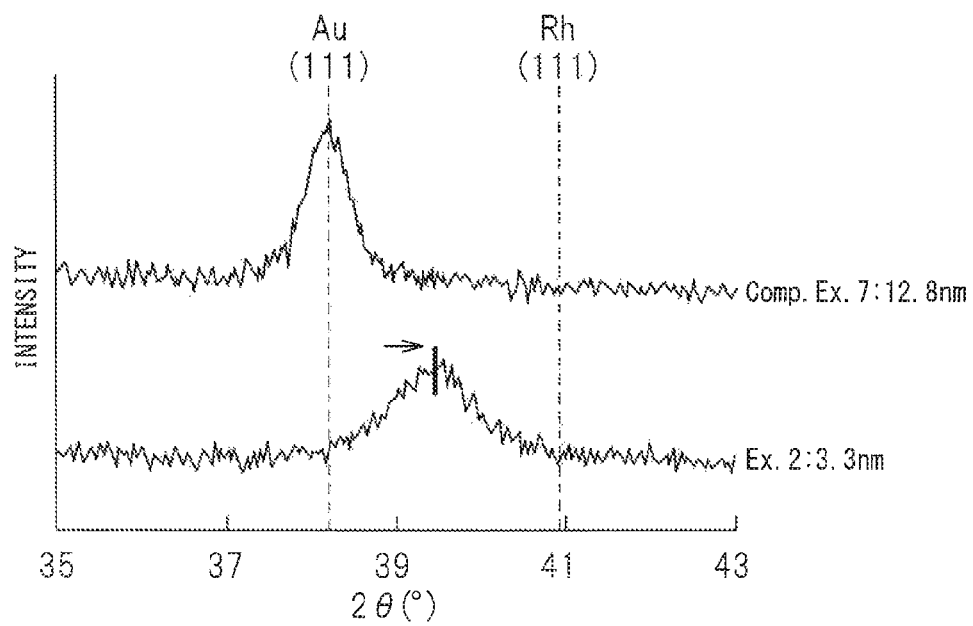
FIG. 4 is a diagram showing X-ray diffraction patterns on samples of Example 2 and Comparative Example 7 in which a composition ratio (molar ratio) of rhodium and gold is 7:3.

FIG. 4 is a diagram showing X-ray diffraction patterns on samples of Example 2 and Comparative Example 7 in which a composition ratio (molar ratio) of rhodium and gold is 7:3. Referring to FIG. 4, it can be seen that each sample of Example 2 and Comparative Example 7 shows a similar tendency to those in FIG. 3. The average particle diameter of the sample of Example 2 was 3.3 nm, which was almost the same value as that of the sample of Example 1. It can be seen that the diffraction peak detected in the sample of Example 2 is shifted by a greater amount towards the literature value for the Rh (111) plane, compared to the sample of Example 1. This is believed to be due to the fact that the sample of Example 2 has a higher rhodium ratio in the metal particles, compared to the sample of Example 1.

Next, the metal particles obtained in Example 1 were analyzed by a scanning transmission electron microscopy equipped with an energy dispersive X-ray spectroscopy (STEM-EDX) (HD-2000 manufactured by Hitachi). FIG. 5 shows the results thereof.

FIG. 5 shows an analysis of the metal particles of Example 1 by a scanning transmission electron microscopy equipped with an energy dispersive X-ray spectroscopy (STEM-EDX). FIG. 5(a) shows a photograph taken by STEM-EDX and FIG. 5(b) shows the composition ratio (atomic %) of rhodium and gold in the metal particles in each of the measuring points 1 to 6 in FIG. 5(a). It can be confirmed from the analysis by STEM-EDX that in the metal particles of Example 1, both rhodium and gold elements are present in the same fine particle. This further supports that rhodium and gold form a solid solution. Furthermore, referring to FIG. 5(b), the composition ratio of rhodium and gold in the metal particles in each measuring point was very consistent with the charging ratio of rhodium and gold, although there was some variability. This also suggests that rhodium and gold form a solid solution. Furthermore, the average particle diameter of the metal particles of Example 1 measured by STEM-EDX was about 3.8 nm, which also almost consistent with the value of the crystallite diameter derived from the XRD analysis.

In the following Examples, exhaust gas purifying catalysts comprising the Rh—Au metal particles according to the present invention as a catalyst component was prepared, and the properties and NOx purifying performance thereof were investigated.

Example 3

Synthesis of Rh—Au Metal Particles Having a Rh Content of 97 Atomic %

First, 2.2 g (20.0 mmol) of polyvinyl pyrrolidone (PVP K-25, an average molecular weight of 35000) as a protecting agent was introduced into a 500 mL separable flask, and the polyvinyl pyrrolidone was completely dissolved in 280 mL of distilled water and was stirred at room temperature (solution 1). Next, 0.0097 g (0.015 mmol) of a chlorauric acid (HiAuCl$_4$) aqueous solution (gold content: 30.552 wt %) as a gold salt and 1.058 g (0.485 mmol) of a rhodium chloride (RhCl$_3$) aqueous solution (rhodium content: 4.717 wt %) as a rhodium salt were dissolved in and mixed with 20 mL of distilled water (solution 2). Then, this solution 2 was added to the above solution 1 in the 500 mL separable flask. The obtained mixed solution was maintained at 30° C. (room temperature) using an oil bath, and was bubbled with nitrogen to create a condition under which rhodium and gold can be easily reduced. Then, 40.0567 g (1.5 mmol) of powdered sodium borohydride (NaBH) as a boron-based reducing agent was added to this mixed solution in portions, and rhodium and gold were reduced by stirring for 1 hour while bubbling with nitrogen.

Next, 1000 mL of acetone was placed in a 2 L beaker, to which the solution obtained above was fed. Then, this mixed solution was treated for 5 minutes with a centrifuge (3000 rpm) to precipitate a product. Then, the colorless and transparent supernatant was discarded, and the residual sodium borohydride was removed. Finally, 200 mL of ethanol was added to the obtained precipitate, and the precipitate was dispersed using an ultrasonic cleaner for 15 minutes, thereby obtaining a solution containing Rh—Au metal particles (Rh content: 97 atomic %).

[Preparation of Rh—Au/$Al_2O_3$—$CeO_2$—$ZrO_2$ (Rh:Au=97:3)]

Next, the solution containing Rh—Au metal particles (Rh content: 97 atomic %) obtained above was placed in a 300 mL beaker, diluted to about 100 mL by adding water, and stirred using a magnetic stirrer. Then, an alumina-ceria-zirconia solid solution powder ($Al_2O_3$:$CeO_2$:$ZrO_2$=50:20:20 (weight ratio)) as a catalyst support was placed in another beaker so that the amount of Rh supported is 0.1 wt % relative to the alumina-ceria-zirconia solid solution powder, which was dispersed by adding about 50 mL of water. The obtained dispersion was added to the above solution containing Rh—Au metal particles (Rh content: 97 atomic %) diluted with water, and the dispersion medium was removed by heating and stirring at about 150° C. Then, after drying at 120° C. for 12 hours, the dried sample was ground in a mortar, and the obtained powder was fired in air at 300° C. for 30 hours to obtain an exhaust gas purifying catalyst of Rh—Au/$Al_2O_3$—$CeO_2$—$ZrO_2$ (Rh:Au=97:3).

Example 4

Preparation of Rh—Au/$Al_2O_3$—$CeO_2$—$ZrO_2$ (Rh:Au=97:3)

Rh—Au metal particles having a Rh content of 97 atomic % were synthesized in the same manner as in Example 3, except for using an ammonia borane (NHiBH) aqueous solution in place of powdered sodium borohydride (NaBH) as a boron-based reducing agent. Then, the Rh—Au metal particles were supported on an alumina-ceria-zirconia solid solution to obtain an exhaust gas purifying catalyst of Rh—Au/$Al_2O_3$—$CeO_2$—$ZrO_2$ (Rh:Au=97:3), in the same manner as in Example 3.

Comparative Example 8

Preparation of Rh/$Al_2O_3$—$CeO_2$—$ZrO_2$

First, 6.7 g (60.0 mmol) of polyvinyl pyrrolidone (PVP K-25, an average molecular weight of 35000) as a protecting agent was introduced to a 1 L separable flask, and the polyvinyl pyrrolidone was completely dissolved in 375 mL of ion-exchanged water. Then, 1.50 mmol of rhodium chloride ($RhCl_3$) as a rhodium salt and 375 mL of ethanol as an alcohol-based reducing agent were added thereto. After the obtained mixed solution was heated at 100° C. using an oil bath to reflux for 2 hours, the reaction solution was allowed to cool to room temperature, thereby obtaining a solution containing Rh metal particles. Then, the obtained Rh metal particles were supported on an alumina-ceria-zirconia solid solution to obtain an exhaust gas purifying catalyst of Rh/$Al_2O_3$—$CeO_2$—$ZrO_2$, in the same manner as in Example 3.

Comparative Example 9

Preparation of Rh,Au/$Al_2O_3$—$CeO_2$—$ZrO_2$ (Rh:Au=97:3)

In this Comparative Example, Rh,Au/$Al_2O_3$—$CeO_2$—$ZrO_2$ (Rh:Au=97:3) comprising rhodium and gold supported on an alumina-ceria-zirconia solid solution was prepared using simply a conventional impregnation method. Specifically, first, a 300 mL beaker was prepared, and 0.045 mmol of chlorauric acid ($HAuCl_4$) as a gold salt and 1.455 mmol of rhodium chloride ($RhCl_3$) as a rhodium salt were placed in the beaker, diluted to about 100 mL by adding water, and stirred using a magnetic stirrer. Then, an alumina-ceria-zirconia solid solution powder ($Al_2O_3$:$CeO_2$:$ZrO_2$=50:20:20 (weight ratio)) as a catalyst support was placed in another beaker so that the amount of Rh supported is 0.1 wt % relative to the alumina-ceria-zirconia solid solution powder, which was dispersed by adding about 50 mL of water. The above aqueous solution containing the gold salt and rhodium salt was added to the obtained dispersion, and evaporated to dryness by heating and stirring at about 150° C. Then, after drying at 120° C. for 12 hours, the dried sample was ground in a mortar, and the obtained powder was fired in air at 500° C. for 2 hours to obtain an exhaust gas purifying catalyst of Rh,Au/$Al_2O_3$—$CeO_2$—$ZrO_2$ (Rh:Au=97:3).

[Analysis of Metal Particles]

Figure 9:
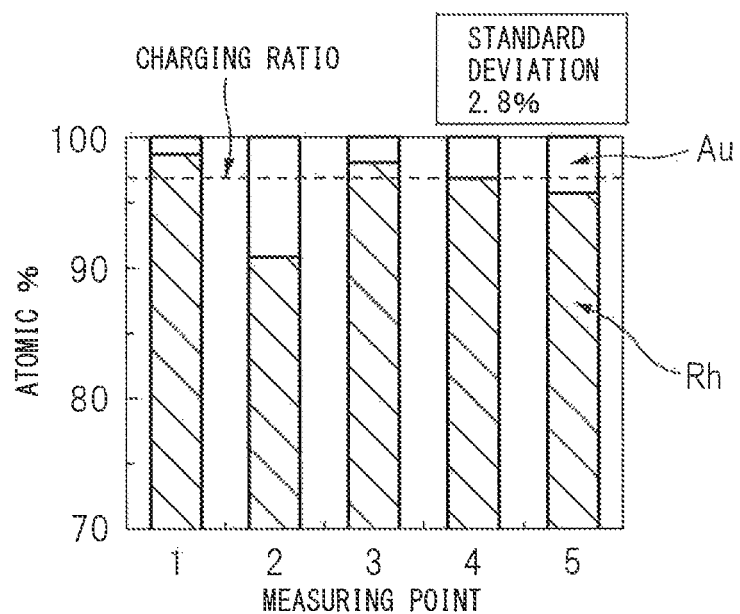
FIG. 9 shows the composition ratio (atomic %) of rhodium and gold in Rh—Au metal particles (Rh content: 97 atomic %) in each of measuring points 1 to 5 in FIG. 8(a).

Each of the metal particles obtained in Examples 3 and 4 was measured by a scanning transmission electron microscopy equipped with an energy dispersive X-ray spectroscopy (STEM-EDX) (HD-2000 manufactured by Hitachi, accelerating voltage: 200 kV). Each solution containing Rh—Au metal particles in Examples 3 and 4 before being supported on a catalyst support was used as a sample for measurement. These sample solutions were diluted with ethanol, and added dropwise to a molybdenum grid. Then, they were dried and used in the measurement. FIGS. 8 and 9 show the results thereof.

FIGS. 8(a) and 8(b) show photographs of Rh—Au metal particles (Rh content: 97 atomic %) in Examples 3 and 4, respectively, taken by a scanning transmission electron microscopy equipped with an energy dispersive X-ray spectroscopy (STEM-EDX). Referring to FIG. 8(a), it can be confirmed that in the Rh—Au metal particles of Example 3 synthesized using sodium borohydride as the boron-based reducing agent, primary particles having a particle size of about several nanometers are homogeneously dispersed without forming secondary particles. On the other hand, referring to FIG. 8(b), it can be seen that in the Rh—Au metal particles of Example 4 synthesized using ammonia borane as the boron-based reducing agent, primary particles have a particle size of about several nanometers as in Example 3, but these primary particles aggregate to form secondary particles having larger particle diameters.

FIG. 9 shows the composition ratio (atomic %) of rhodium and gold in the Rh—Au metal particles (Rh content: 97 atomic %) in each of measuring points 1 to 5 in FIG. 8(a). Referring to FIG. 9, the composition ratio of rhodium and gold in the Rh—Au metal particles in each measuring point was very consistent with the charging ratio (97:3) of rhodium and gold. It is confirmed from the analysis by STEM-EDX in FIGS. 8 and 9 that in the Rh—Au metal particles of Examples 3 and 4, both rhodium and gold elements are present in the same primary particle, in particular, it was found that the dispersibility of the obtained metal particles (primary particles) is remarkably improved by using sodium borohydride as the boron-based reducing agent.

Figure 10:
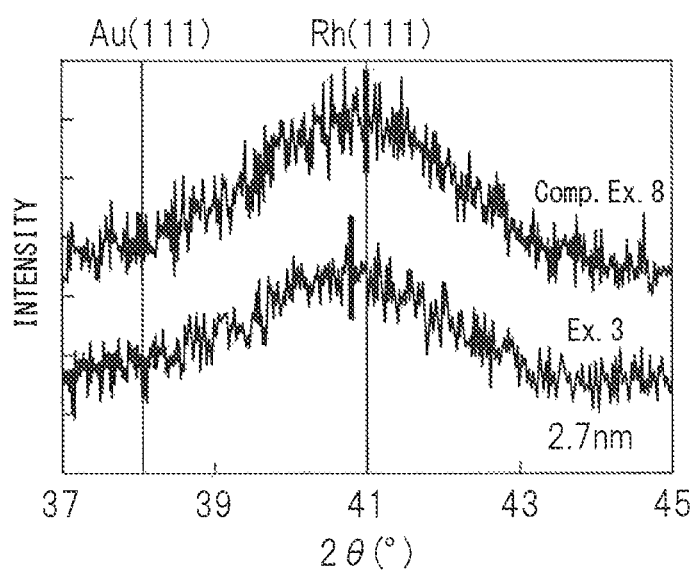
FIG. 10 is a diagram showing X-ray diffraction patterns on Rh—Au metal particles (Rh content: 97 atomic %) in Example 3 and Rh metal particles in Comparative Example 8.

Next, each of the metal particles obtained in Example 3 and Comparative Example 8 was measured by X-ray diffraction (XRD) (RINT2000 manufactured by Rigaku). The specific conditions of measurement are as previously described in Example 1, etc. FIG. 10 is a diagram showing X-ray diffraction patterns on the Rh—Au metal particles (Rh content: 97 atomic %) in Example 3 and the Rh metal particles in Comparative Example 8. FIG. 10 also shows literature values of diffraction peaks for the Au (111) plane and Rh (111) plane in dotted lines.

Furthermore, the average particle diameter of the Rh—Au metal particles in Example 3 was calculated using a crystallite diameter calculating method by the half-width measurement in X-ray diffraction. FIG. 10 also shows the results thereof.

Referring to FIG. 10, in the Rh metal particles in Comparative Example 8, a diffraction peak from the Rh (111) plane was detected at around 2θ=41°. This is consistent with the literature value for the Rh (111) plane, and no shift in peak was observed relative to the literature value. In contrast, in the Rh—Au metal particles in Example 3, a diffraction peak was detected at 2θ=40.8°, thereby confirming that this diffraction peak is located between the literature values for the Au (111) plane and Rh (111) plane. The average particle diameter of the detected particles was 2.7 nm. It can be seen from these results that the metal, particles produced by the method of the present invention are very fine alloy particles, in which rhodium and gold are solid-solutioned at the atomic level.

[Analysis of Catalyst]

Next, each exhaust gas purifying catalyst of Rh—Au/$Al_2O_3$—$CeO_2$—$ZrO_2$ (Rh:Au=97:3) of Example 3 and Rh/$A_2O_3$—$CeO_2$—$ZrO_2$ of Comparative Example 8 was measured by an X-ray photoelectron spectroscopy (XPS) instrument (PHI-5700 manufactured by ULVAC-PHI). Specific conditions for measurement are as follows.

X-ray source: AlKα 350 W
Neutralizing gun: ON
Aperture: No. 4 (ϕ800 μm)
(Qualitative)
PE: 187.85 eV
STEP: 0.4 eV
Time/Step: 20 ms
(Quantitative/Condition Analysis)
HPES mode PE: 46.95 eV
STEP: 0.1 eV
Time/Step: 50 ms In the condition analysis, shift correction was made at C1s 284.8 eV.

Figure 11:
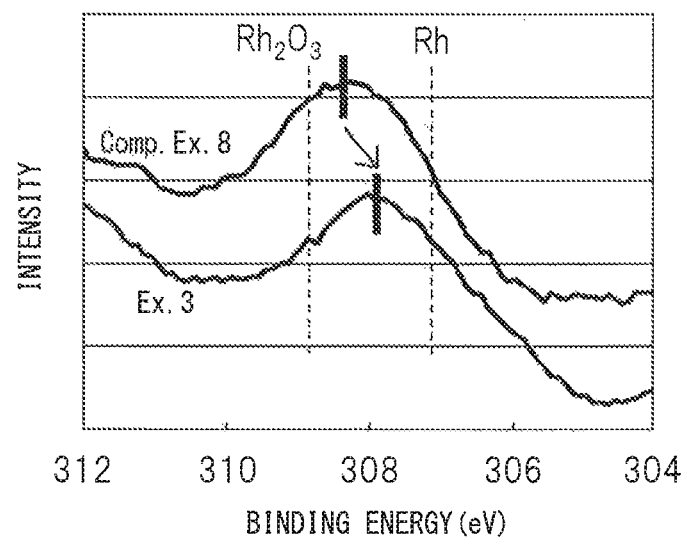
FIG. 11 shows an analysis of exhaust gas purifying catalysts of Example 3 and Comparative Example 8 by X-ray photoelectron spectroscopy (XPS).

FIG. 11 shows an analysis of exhaust gas purifying catalysts of Example 3 and Comparative Example 8 by X-ray photoelectron spectroscopy (XPS). FIG. 31 also shows literature values of the binding energy for Rh (III) (corresponding to the oxide of $Rh_2O_3$) and the binding energy of Rh at the metal state in dotted lines. Referring to FIG. 11, it can be confirmed from the analysis of the Rh3d orbit that in Rh/$Al_2O_3$—$CeO_2$—$ZrO_2$ of Comparative Example 8 supporting Rh alone, a peak is detected at a position nearer to the binding energy value of Rh (III). Thus, it is believed that in the exhaust gas purifying catalyst of Comparative Example 8, the majority of Rh on the surface of the catalyst is in an oxidized state by firing treatment in air after supporting Rh on the catalyst support.

In contrast, in Rh—Au/$Al_2O_3$—$CeO_2$—$ZrO_2$ (Rh:Au=97:3) of Example 3 in which rhodium and gold form a homogeneous solid solution at the atomic level, a peak was detected at a position nearer to the binding energy value of Rh, compared to Rh/$Al_2O_3$—$CeO_2$—$ZrO_2$ of Comparative Example 8. Thus, it is believed that in the exhaust gas purifying catalyst of Example 3, even when it is subjected to firing treatment in air, etc., oxidation of Rh is suppressed due to solid-solution of Rh and Au at the atomic level.

Figure 12:
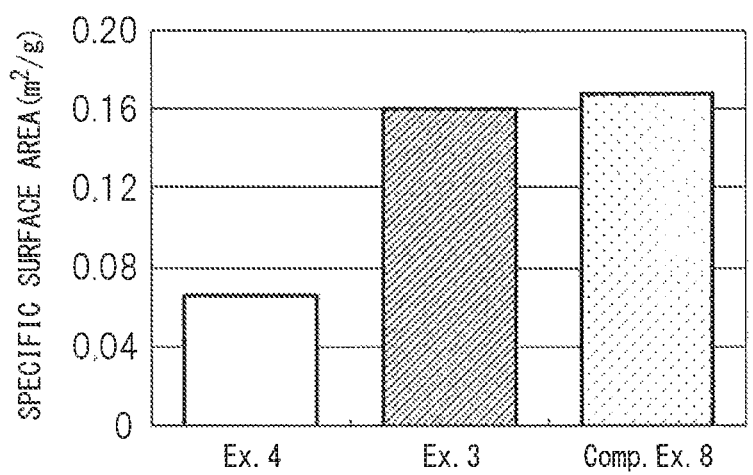
FIG. 12 is a graph showing measurements of the exhaust gas purifying catalysts of Examples 3 and 4 and Comparative Example 8 by a CO pulse adsorption method.

Next, each exhaust gas purifying catalyst of Rh—Au/$Al_2O_3$—$CeO_2$—$ZrO_2$ (Rh:Au=97:3) of Examples 3 and 4 and Rh/$Al_2O_3$—$CeO_2$—$ZrO_2$ of Comparative Example 8 was measured for the amount of CO adsorption by a CO adsorption measuring instrument (R-6015 manufactured by Ohkurariken, pretreatment temperature: 300° C., operation temperature: −50° C.), thereby calculating the specific surface area ($m^2/g$) of each exhaust gas purifying catalyst. FIG. 12 shows the result thereof.

FIG. 12 is a graph showing measurements of the exhaust gas purifying catalysts of Examples 3 and 4 and Comparative Example 8 by a CO pulse adsorption method. Referring to FIG. 12, it can be seen that the exhaust gas purifying catalyst of Example 3 has a very high specific surface area, compared to the exhaust gas purifying catalyst of Example 4 having the same composition ratio (Rh:Au=97:3) of rhodium and gold. This is believed to be due to the fact that in the exhaust gas purifying catalyst of Example 3, the dispersibility of the obtained Rh—Au metal particles (primary particles) is improved by using sodium borohydride as a boron-based reducing agent in the method of the present invention, as shown in FIG. 8(*a*). In other words, it is believed that in the exhaust gas purifying catalyst of Example 4, the primary particles of Rh—Au metal particles aggregate to form secondary particles having larger particle diameters, as shown in FIG. 8(*b*), resulting in a decrease in the number of rhodium active sites. On the other hand, the exhaust gas purifying catalyst of Comparative Example 8 supporting Rh alone exhibited a surface area almost equal to the exhaust gas purifying catalyst of Example 3.

[Activity Evaluation of Catalyst]

Figure 13:
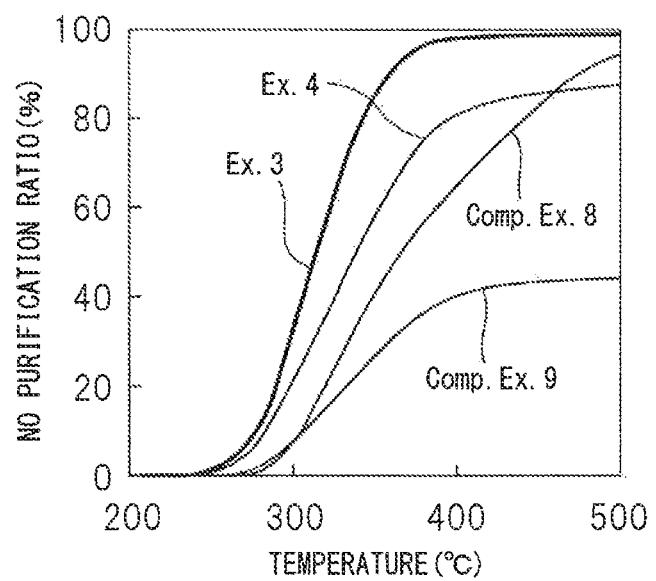
FIG. 13 is a graph showing the NO purification ratio on the exhaust gas purifying catalysts of Examples 3 and 4 and Comparative Examples 8 and 9.

Next, each of the exhaust gas purifying catalysts of Examples 3 and 4 and Comparative Examples 8 and 9 was evaluated for the NOx reducing performance thereof. The powder of each exhaust gas purifying catalyst prepared above was pressed at a pressure of 98 MPa and high-pressure molded into pellet forms, which were used as samples for evaluation. With respect to 3.0 g of each pellet catalyst, the NO purification ratio was measured during raising the temperature of a catalyst bed from room temperature (about 25° C.), while flowing a model gas for evaluation shown in the following Table 2 through the catalyst bed at a flow rate of 15 L/min. FIG. 13 shows the result thereof.

TABLE 2

| | Gas composition | | | | | | |
|---|---|---|---|---|---|---|---|
| | CO (%) | $C_3H_6$ (ppm) | NO (ppm) | $O_2$ (%) | $CO_2$ (%) | $H_2O$ (%) | $N_2$ |
| Model gas for evaluation | 0.65 | 1000 | 1500 | 0.68 | 10 | 3 | Balance |

FIG. 13 is a graph showing the NO purification ratio on the exhaust gas purifying catalysts of Examples 3 and 4 and Comparative Examples 8 and 9. In FIG. 13, the abscissa axis indicates the temperature (° C.) of the catalyst bed, and the ordinate axis indicates the NO purification ratio (%). As is clear from the result in FIG. 13, in the exhaust gas purifying catalyst of Example 3, the highest NO purification ratio was achieved at all temperatures, compared to the other exhaust gas purifying catalysts. In particular, the exhaust gas purifying catalyst of Example 3 exhibited a significantly higher NOx reducing performance, compared to the exhaust gas purifying catalyst of Comparative Example 8 supporting Rh alone and having an equivalent specific surface area. This is believed to be due to the fact that oxidation of Rh is suppressed due to solid-solution of Rh and Au at the atomic level, as shown in FIG. 11.

Furthermore, when the exhaust gas purifying catalyst of Example 4 is compared to the exhaust gas purifying catalyst of Comparative Example 8 supporting Rh alone, the exhaust gas purifying catalyst of Example 4 has only a specific surface area not greater than half that of the exhaust gas purifying catalyst of Comparative Example 8 (see FIG. 12). However, the exhaust gas purifying catalyst of Example 4 achieved a remarkably improved NO purification ratio relative to the exhaust gas purifying catalyst of Comparative Example 8, except that the NO purification ratio of the exhaust gas purifying catalyst of Example 4 was low in a high-temperature region of about 450° C. or greater. On the other hand, the exhaust gas purifying catalyst of Comparative Example 9, in which Rh and Au were supported on a catalyst support by simply impregnating the catalyst support with a mixed solution containing the salts of Rh and Au, exhibited the lowest NOx reducing performance among the catalysts evaluated for activity. It is believed that in the exhaust gas purifying catalyst of Comparative Example 9, Rh and Au do not form a solid solution, and therefore the oxidation suppressing effect of Rh due to Au cannot be obtained.

It is believed from these results that since Rh and Au coexist in the same particle due to solid-solution of these metals at the atomic level, oxidation of Rh can be suppressed by Au, thereby enhancing the NOx reducing activity of Rh.

INDUSTRIAL APPLICABILITY

According to the present invention, it is possible to obtain metal particles comprising a solid solution of rhodium and gold, more specifically metal particles comprising a solid solution of rhodium and gold at the atomic level and having an average particle diameter of about 6 nm or less, in particular about 4 nm or less. Furthermore, according to an exhaust gas purifying catalyst comprising such metal particles supported on a catalyst support, oxidation of rhodium in the metal particles can be suppressed by allowing rhodium and gold to coexist in the same particle. As a result, since the catalytic activity of rhodium can be maintained at a high level, it is possible to remarkably improve the exhaust gas purifying performance, especially the NOx purifying performance at a low temperature, of the exhaust gas purifying catalyst.

The invention claimed is:

1. Metal particles, comprising an at least partial solid solution of rhodium and gold, wherein said metal particles have a diffraction peak at $38.1°<2\theta<41°$ in X-ray diffraction with a CuK$\alpha$ ray, and wherein said metal particles have an average particle diameter of 6 nm or less and a rhodium content of 70 atomic % or more and 99 atomic % or less.

2. The metal particles as claimed in claim 1, wherein said metal particles have an average particle diameter of 4 nm or less.

3. The metal particles as claimed in claim 1, wherein said metal particles have a rhodium content of 95 atomic % or more and 99 atomic % or less.

4. An exhaust gas purifying catalyst, comprising the metal particles as claimed in claim 1 supported on a catalyst support.

5. A method for producing metal particles as claimed in claim 1, comprising adding a boron-based reducing agent to a mixed solution containing a rhodium salt and a gold salt without a heating process to produce said metal particles comprising an at least partial solid solution of rhodium and gold.

6. The method as claimed in claim 5, wherein said boron-based reducing agent is ammonia borane.

7. The method a claimed in claim 5, wherein said boron-based reducing agent is sodium borohydride.

8. The method a claimed in claim 5, wherein said mixed solution further contains a protecting agent.

9. The method as claimed in claim 5, wherein said mixed solution contains said rhodium salt and said gold salt in amounts such that said metal particles have a rhodium content of 70 atomic % or more and 99 atomic % or less.

10. The method as claimed in claim 9, wherein said mixed solution contains said rhodium salt and said gold salt in amounts such that said metal particles have a rhodium content of 95 atomic % or more and 99 atomic % or less.

11. An exhaust gas purifying catalyst, comprising metal particles supported on a catalyst support, wherein said metal particles comprises an at least partial solid solution of rhodium and gold, wherein said metal particles have a diffraction peak at $38.1°<2\theta<41°$ in X-ray diffraction with a CuK$\alpha$ ray, and wherein said metal particles have an average particle diameter of 6 nm or less.

12. The exhaust gas purifying catalyst as claimed in claim 11, wherein said metal particles have a rhodium content of 70 atomic % or more and 99 atomic % or less.

13. The exhaust gas purifying catalyst as claimed in claim 11, wherein said metal particles have a rhodium content of 95 atomic % or more and 99 atomic % or less.

14. A method for producing an exhaust gas purifying catalyst as claimed in claim 11, comprising:
adding a boron-based reducing agent to a mixed solution containing a rhodium salt and a gold salt without a heating process to produce metal particles comprising an at least partial solid solution of rhodium and gold; and
supporting the produced metal particles on a catalyst support.

* * * * *